United States Patent [19]

Avery et al.

[11] 4,351,019
[45] Sep. 21, 1982

[54] FACETTED REFLECTOR

[75] Inventors: Stephen T. Avery, Rochester; John A. Durbin; William L. Lama, both of Webster; Paul H. Steibitz, Rochester, all of N.Y.

[73] Assignee: Xerox Corporation, Stamford, Conn.

[21] Appl. No.: 278,537

[22] Filed: Jun. 29, 1981

Related U.S. Application Data

[63] Continuation of Ser. No. 54,357, Jul. 2, 1979, abandoned.

[51] Int. Cl.³ .................................................. F21V 7/05
[52] U.S. Cl. .................................... 362/298; 362/301; 362/346; 362/350; 355/71
[58] Field of Search ........ 362/297, 298, 301, 346–350; 355/65–67, 71; 350/292

[56] References Cited

U.S. PATENT DOCUMENTS

| | | | |
|---|---|---|---|
| Re. 29,017 | 10/1976 | Hildenbrant | 362/302 |
| 1,133,955 | 3/1915 | Gray | 362/349 |
| 1,253,813 | 1/1918 | Gray | 362/348 |
| 2,198,014 | 4/1940 | Ott | 362/346 |
| 2,297,124 | 9/1942 | Anderson | 362/346 |
| 2,823,579 | 2/1958 | Fitter | 355/49 |
| 2,945,417 | 7/1960 | Caryl | 350/292 |
| 3,296,432 | 1/1967 | Le Vantine | 362/346 |
| 3,316,804 | 5/1967 | Weisglass | 362/350 X |
| 3,510,191 | 5/1970 | Cannon | 362/346 |
| 3,702,930 | 11/1972 | Joel | 355/67 |
| 3,779,640 | 12/1973 | Kidd | 355/67 |
| 3,829,210 | 8/1974 | Langer | 355/67 |
| 3,982,116 | 9/1976 | Sakuma | 355/67 |
| 4,190,355 | 2/1980 | Avery et al. | 362/346 X |
| 4,218,727 | 8/1980 | Shavitz et al. | 362/297 |
| 4,241,389 | 12/1980 | Heimer | 362/346 X |
| 4,241,392 | 12/1980 | Boone | 362/346 X |

OTHER PUBLICATIONS

Maddox et al., *Copier Illumination System*, IBM Tech. Disc. Bull., #20, Jul. 1977, pp. 488–489.

*Primary Examiner*—Peter A. Nelson

[57] ABSTRACT

A facetted reflector faces a linear scanning illumination source and directs light onto an object plane. The tilt angle and length of each linear mirror segment (facet) comprising the reflector are designed to achieve maximum illumination at an object scan line consistent with the geometry of the particular illumination system.

1 Claim, 11 Drawing Figures

FACETTED REFLECTOR

This is a continuation of application Ser. No. 54,357, filed July 2, 1979, and now abandoned.

BACKGROUND OF THE INVENTION AND STATEMENT OF PRIOR ART

This invention relates to a slit scanning document illumination system which includes a facetted reflector opposite the illumination source.

In slit scanning photocopying systems, a common requirement is for relatively balanced illumination from both sides of the exposure slit. The exposure slit width is a system constraint which essentially determines the required shape of the illumination profile. Thus, the profile for a narrow exposure slit should be strongly peaked at the slit position while a wide exposure slit is compatible with a wide illumination source aperture.

It is known in the art how to enhance the required reflector opposite a scanning lamp. See, for example, U.S. Pat. No. 3,982,116 which discloses the use of an elliptical-type reflector opposite a scanning lamp.

In co-pending application, Ser. No. 802,750 assigned to the same assignee as the instant application, there is disclosed the use of a multi-segmented, or "Fresnel" reflector opposite a scanning lamp. This reflector optically simulates a cylindrical reflector by orienting a large number of plane mirror segments (in the order of 100 segments per inch) parallel to tangents of the cylindrical surface to be simulated. When subjected to the same physical constraints as its cylindrical counterpart, the Fresnel reflector exhibits improved illumination efficiency at the scan strip area.

These prior art reflectors have certain disadvantages. The cylindrical-type reflectors are subject to aberrations which cause light loss at the object plane. The Fresnel reflector, to the degree that simulation is successful, also suffers from the same aberration as the conic section it is simulating. The design of these prior art reflectors is also complicated by the space constraints imposed by the particular system geometry. Generally, an iterative, time-consuming optimization procedure is required during the design phase.

The facetted reflector of the present invention is distinguishable over the prior art by having a relatively small number of facets, each facet having a specific tilt angle and length such that at a given point on a given scan line the source is visible, by reflection, from every point on every facet.

The design of the facetted reflector is optimized by use of reflector design equations which incorporate the geometrical constraints of the particular illumination system. Since the facets are not designed to simulate any conic section, they are not subject to aberrations and the attendant loss of light. Additionally, the present reflector eliminates the facet "shadowing" at the design point which exists in the Fresnel reflector thereby rendering even greater illumination efficiency when comparing reflectors having the same system constraints.

It is an object of the present invention to provide a scanning illumination system which provides maximum possible illumination at a given object illumination scan area within given system constraints.

Another object is to facilitate and optimize the design of a facetted reflector.

Another object is to provide a reflector for a scanning illumination system which is not subject to aberrations at the design line.

A further object is to provide a scanning illumination system which will provide more intense illumination over a narrow exposure slit.

A still further object is to provide a facetted reflector requiring relatively few specularly reflecting facets.

SUMMARY OF THE INVENTION

This invention provides a slit scanning illumination system in which a linear light source illuminates a scan portion of an object plane. A facetted reflector faces the source so as to achieve maximum reflection of the light onto an area on the object plane. Each mirrored facet of the reflector is designed so that the light source is visible from the specified object point or line by reflection, from every point on the facet. The reflector is constructed of a rigidly connected series of linear mirror segments (facets) which are designed to occupy all of the effective space allotted in a particular system for the reflector element. Each facet angle and length is determined by design equations to fulfill the requirement to maximize illumination at a specific object area. The reflector does not simulate any specific surface and is free of aberrations present in prior art reflectors.

DETAILED DESCRIPTION OF THE INVENTION

Figure 1:
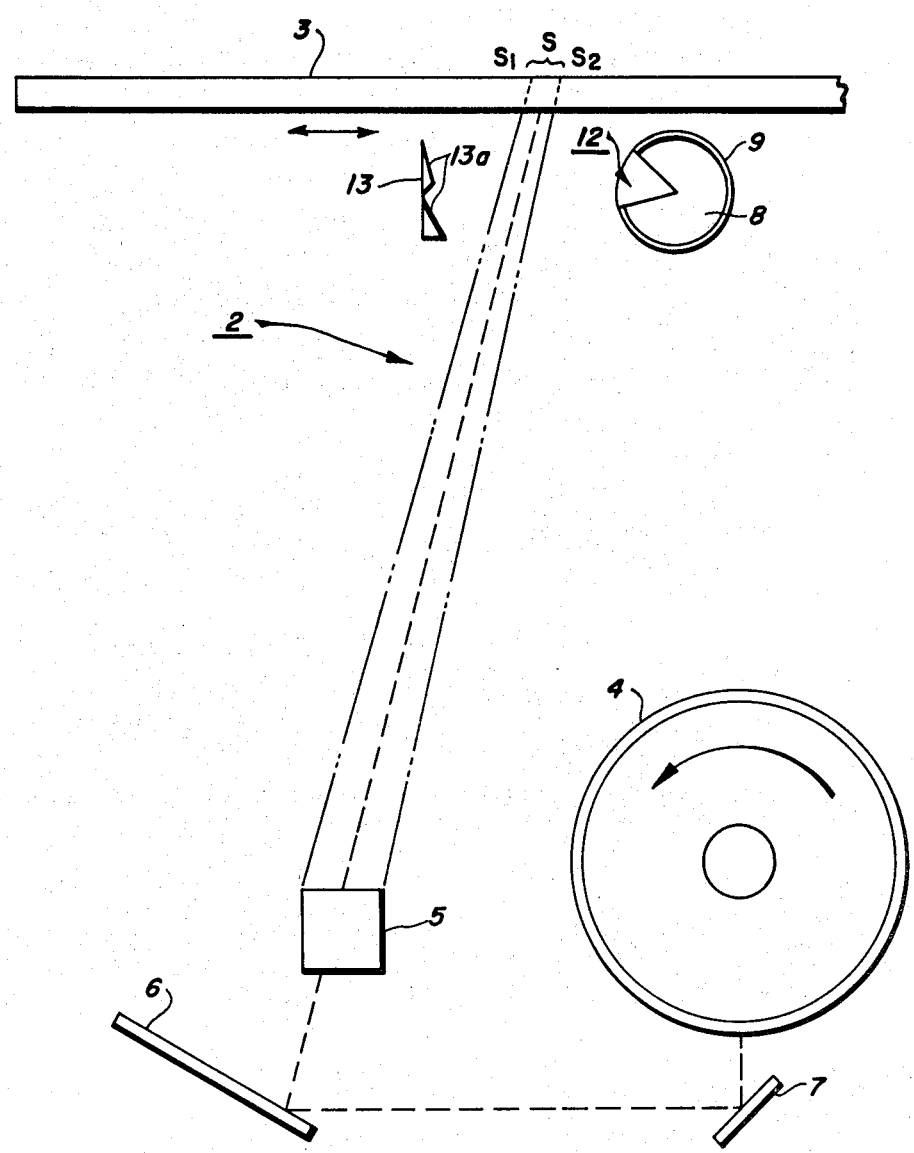
FIG. 1 is a schematic optical diagram of a photocopier scanning illumination system utilizing a facetted reflector of the present invention.

Referring now to FIG. 1, a scanning illumination system for a photocopier is indicated generally at 2 and includes a platen 3 disposed in an object plane, a photoreceptor drum 4, disposed in an image plane, a projection lens 5 located between the object and image planes, and first and second mirrors 6 and 7 to fold the optical system. A linear scanning lamp 8 located immediately beneath the platen is a tubular lamp whose length extends across the appropriate portion of the platen (into the plane of the page). In an exemplary embodiment, lamp 8 is a fluorescent lamp which includes a reflective coating 9 on the lamp envelope. The coating is omitted from a portion of the envelope so that a clear longitudinal aperture 12 is formed permitting the illumination to be transmitted towards the reflector and the platen. A facetted reflector 13 comprising a rigidly connected set of plane mirrors (facets) 13a, is positioned so as to face the light aperture 12 of lamp 8. Reflector 13 can be mounted to move coextensive with lamp 8 in the direction shown by the arrows (by drive means 14) or platen 3 can be moved while the lamp and reflector remain stationary. Lamp 8 and reflector 13 are located so that they are on opposite sides of an instantaneous strip scan area S. This scan area is defined between lines passing through points S1, S2 and edges of the lens aperture.

In operation, an original document (not shown) is placed on top of platen 3. Lamp 8, in a timed relation with drum 4, scans platen 3 while reflector 13, moving coextensively with the lamp, directs reflected light towards the scan slit. As shown more clearly in FIG. 2, each facet 13a is set at an angle and is of such length that the entire aperture of lamp 8 is visible from a design point $X_o$, $Y_o$. (For ease of explanation, $X_o$, $Y_o$ is shown as a two-dimensional point but it is understood that it lies on a line in the center of the scan strip, the line having a Z dimension into the plane of the page). Simultaneously, with the movement of the lamp and reflector, lens 5 scans in the same direction at an appropriate speed depending on system magnification. A flowing light image of the original document is then recorded as an electrostatic latent image on the surface of drum 4.

Figure 2:
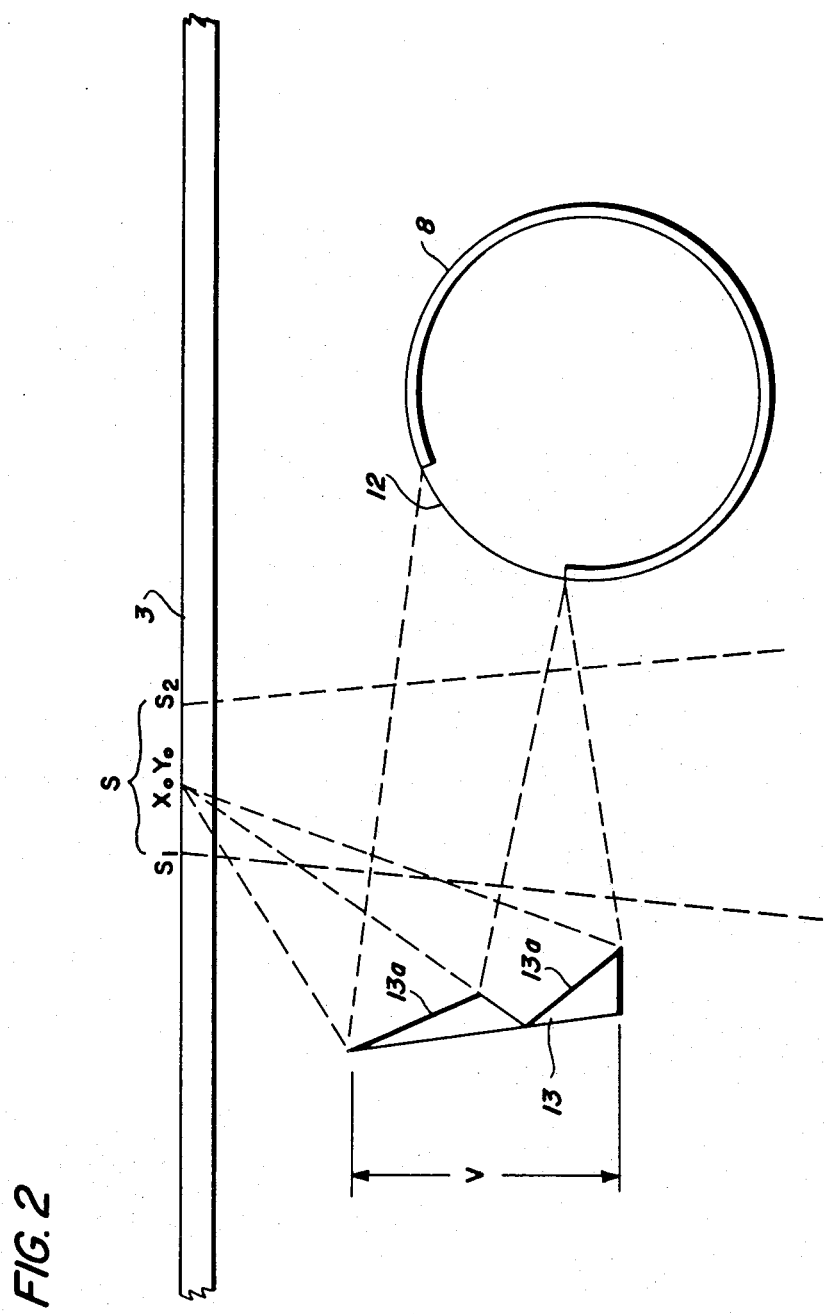
FIG. 2 is an enlarged view of one embodiment of a facetted reflector and light source.

Referring to FIG. 2, reflector 13 is seen to fully occupy a vertical dimension V which represents the maximum space available for containment of the reflector in the particular system geometry. Each facet 13a of reflector 13 is designed so that, looking at the reflector from a design point, $X_o$, $Y_o$ every point on every facet is seen as reflecting light from aperture 12 of lamp 8. In other words, the aperture 12 can be seen from point $X_o$, $Y_o$ by reflection from every point on every facet 13a so that the whole reflector is filled (flashed) with light emanating from the aperture. With this configuration and within these space constraints $X_o$, $Y_o$ is receiving the greatest possible irradiance from the reflector.

Figure 4:
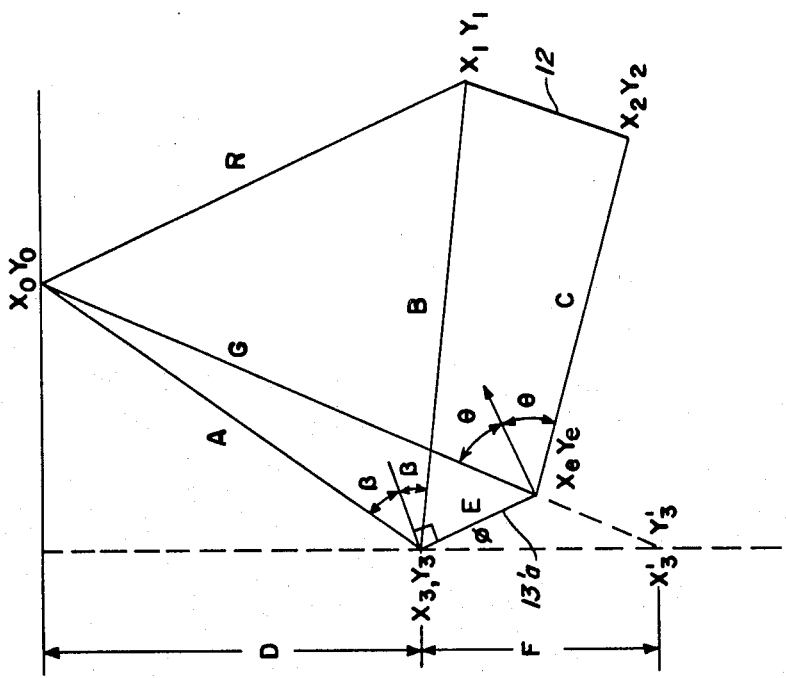
FIG. 4 is a schematic diagram illustrating the design of a single facet.
Figure 3:
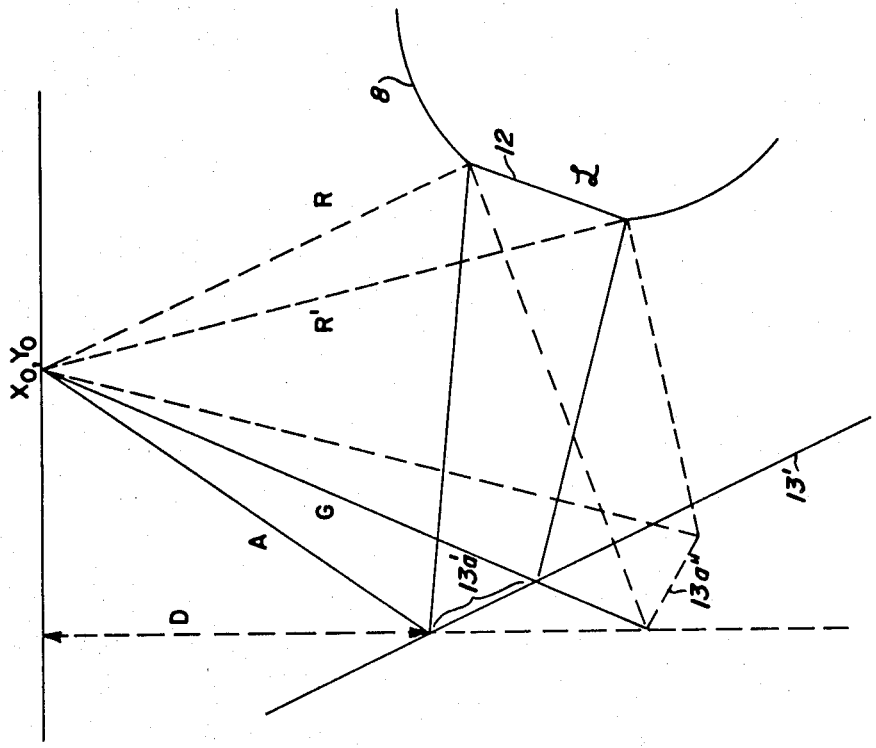
FIG. 3 is a schematic diagram which illustrates the determination of the useful segment of a mirror opposed to the light source.
Figure 5:
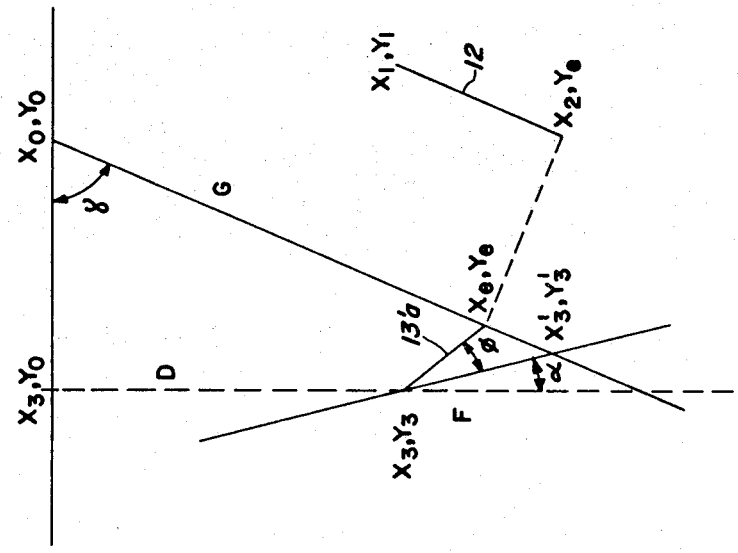
FIG. 5 is a schematic diagram illustrating the design of a facet where the reflector backbone is tilted at an angle from the vertical.

Referring now to FIG. 3, the general theory and description of facet design according to the present invention is presented followed by more specific explanations in conjunction with FIGS. 4 and 5. In FIG. 3, the document illumination $\epsilon$ is shown as being produced by lamp 8 having an aperture 12 of radiance L. A simple plane mirror 13' is shown opposite the lamp, the mirror having a reflectance ($\rho$). For purposes of this discussion, it is assumed that the lamp and reflector 13 extend infinitely into the plane of the page.

From the specified design point $X_o$, $Y_o$ the lamp 8 is seen directly (by rays, R,R') and also by reflection from mirror 13'. The irradiance at $X_o$, $Y_o$ is the sum of the direct irradiance, proportional to L and the contribution from the mirror, which is proportional to L, (as derived from the known radiation transfer equations for light reflected from a flat mirror). Notice, in FIG. 3, that only a small segment (13a') of the mirror 13' sends light to the specified design point (rays, A, G); the rest of the mirror, could be eliminated without changing the irradiance at $X_o$, $Y_o$. This useful segment 13a' constitutes a single facet and a rigidly connected set of facets comprise a facetted reflector. That is, if the remainder of the mirror outside the facet 13a'' is eliminated, other facets can be generated which will supplement the irradiance at the specified point. A second such facet (13a') is shown as a dashed line in FIG. 3. The end points of each facet are determined by specular reflection of rays from the endpoints of the source, as will be shown in conjunction with the discussion of FIG. 4. This procedure proceeds facet-by-facet until a facet extends to the space limitation constraints for the given illumination system. The only other limitation on the mirror design is that a facet not extend into the scan strip dimension defined by lines S1, S2 in FIG. 1 since this would prevent a portion of the light from reaching the imaging lens.

Referring now to FIG. 4, the calculation of a single facet 13a' of length E and tilt angle $\phi$ is shown. The endpoints of facet 13a' have the coordinates $X_3 Y_3$ and $X_e Y_e$, respectively. The document field point, or design point is $X_o Y_o$ shown, for simplicity, on a platen having negligible thickness. The effects caused by refraction of a platen having an appreciable thickness is discussed in connection with the description of FIGS. 6, 7 and 8.

The edges of the diffuse light source (aperture 12) are specified by $X_1 Y_1$ and $X_2 Y_2$. The facet starting point $X_3 Y_3$ begins at the distance D below the platen. This distance is usually determined by the minimum mechanical clearance consistent with the system geometry. The facet tilt angle and length E are to be determined. These variables are determined by specular reflection of the rays from the ends of the source to the design point. Thus, ray B leaves the source at $X_1$, $Y_1$, strikes the facet at $X_3$, $Y_3$, is specularly reflected at an angle $\beta$, and proceeds as ray A to the design point $X_o$, $Y_o$. By apply the law of cosines to the enclosed triangle, one obtains $$\phi = \tfrac{1}{2} \cos^{-1}\left[\frac{R^2 - A^2 - B^2}{2AB}\right] - \tan^{-1}\left(\frac{L}{D}\right) \tag{1}$$

This is the desired equation for the facet tilt in terms of the system parameters. Of course, the lengths A, B, . . . etc., may be written as functions of the given X,Y coordinates, as follows:

$$A = [(X_3 - X_o)^2 + (Y_3 - Y_o)^2]^{\frac{1}{2}} \tag{2}$$

$$B = [(X_3 - X_1)^2 + (Y_3 - Y_1)^2]^{\frac{1}{2}} \tag{3}$$

$$R = [(X_1 - X_o)^2 + (Y_1 - Y_o)^2]^{\frac{1}{2}} \tag{4}$$

$$G = [(X_o - X_e)^2 + (Y_o - Y_e)^2]^{\frac{1}{2}} \tag{5}$$

$$D = Y_o - Y_3 \tag{6}$$

$$L = X_o - X_3 \tag{7}$$

To find the end point of the facet $X_e, Y_e$, consider the ray C which originates at the edge of the source $X_2$, $Y_2$, is specularly reflected at $X_e$, $Y_e$, and proceeds to the field point as ray G.

The requirement of specular reflection yields the following solution for the facet endpoint:

$$Y_e = \frac{-(K - JQ) \pm [(K - JQ)^2 - 4P(1 - Q)(N - MQ)]^{\frac{1}{2}}}{2P(1 - Q)} \tag{8}$$

$$H = (X_3 - X_0)\cos\phi + (Y_3 - Y_o)\sin\phi \tag{9}$$
$$I = (X_3 - X_2)\cos\phi + (Y_3 - Y_2)\sin\phi \tag{10}$$
$$J = -2Y_o - 2\tan\phi \, [Y_3\tan\phi + X_3 - X_o] \tag{11}$$
$$K = -2Y_2 - 2\tan\phi \, [Y_3\tan\phi + X_3 - X_2] \tag{12}$$
$$M = Y_o^2 + [Y_3\tan\phi + X_3 - X_o]^2 \tag{13}$$
$$N = Y_2^2 + [Y_3\tan\phi + X_3 - X_2]^2 \tag{14}$$
$$P = 1 + \tan^2\phi = \sec^2\phi \tag{15}$$

-continued $$Q = I^2 / H^2 \tag{16}$$

The coordinate $Y_e$ of the facet endpoint may be obtained from Eq. (8), with the aid of a computer. The value of $Y_e$ is a function of the input parameters $X_o$, $Y_o$, $X_2$, $Y_2$, $X_3$, $Y_3$ as well as the variable $\phi$ given by Eq. (1). Once $Y_e$ is found, the X coordinate of the endpoint is obtained from equation (17):

$$X_e = X_3 - (Y_e - Y_3)\tan \phi \tag{17}$$

where $Y_e$ is given by Eq. (18). Finally, the length of the facet is:

$$E = [(X_3 - X_e)^2 + (Y_3 - Y_e)^2]^{\frac{1}{2}} \tag{18}$$

Thus, the tilt $\phi$ and length E of the facet has been determined by the requirement that rays from the edges of the source reflect specularly from the ends of the facet and converge at the design point $X_o$, $Y_o$.

The starting point of the next facet can be anywhere along the extension of the ray G. In FIGS. 3 and 4, the starting points of the two facets fall on a vertical line. In this case, the starting point of the second facet has coordinates:

$$X'_3 = X_3 \tag{19}$$

$$Y'_3 = Y_3 - F \tag{20}$$

where:

$$F = L\left(\frac{Y_o - Y_e}{X_o - X_e}\right) - D \tag{21}$$

On the other hand, it may be desirable to tilt the backbone of the reflector at an angle $\alpha$, as shown in FIG. 5. In this case, the coordinates of the starting point of the second facet are:

$$X'_3 = X_3 + F \frac{\cos\gamma \sin\alpha}{\cos(\gamma - \alpha)} \tag{22}$$

$$Y'_3 = Y_3 + F \frac{\cos\gamma \cos\alpha}{\cos(\gamma - \alpha)} \tag{23}$$

where F is again given by Eq. (21). However, in this case, the facet tilt angle $\phi$, given before by Eq. (1), must be modified by the reflector inclination $\alpha$. Thus, for a reflector inclined at an angle $\alpha$, the facet tilt is given by:

$$\phi = \frac{1}{2}\cos^{-1}\left[\frac{R^2 - A^2 - B^2}{2AB}\right] - \tan^{-1}\left(\frac{L}{D}\right) - \alpha \tag{24}$$

The calculation of the length of the facet E proceeds exactly as in the case of a vertical reflector ($\alpha = 0$) with the simple replacement of $\phi$ by ($\phi + \alpha$) in all the equations (9-17). Once the starting point of the second facet is found, its tilt angle $\phi$ and length E are determined in the same manner as for the first facet. This same procedure is then repeated for each succeeding facet of the reflector until the physical space limitation is reached or until the reflector begins to intrude into the scan area.

Figure 6:
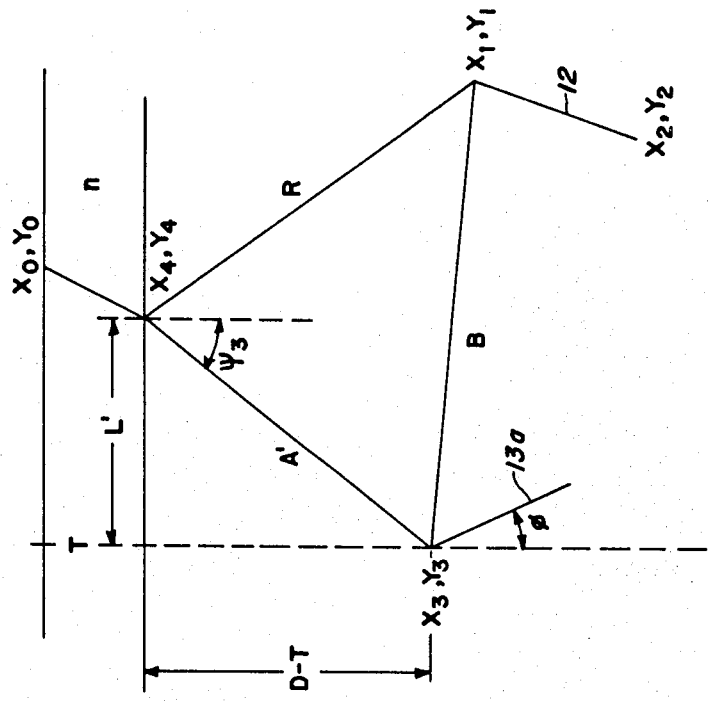
FIGS. 6 and 7 and 8 are schematic diagrams illustrating the design consideration introduced by use of a platen in a photocopying system.
Figure 8:
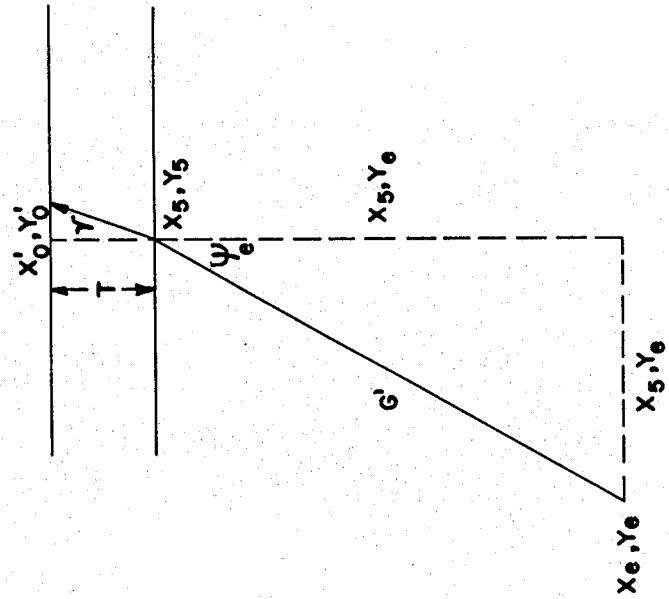
Figure 7:
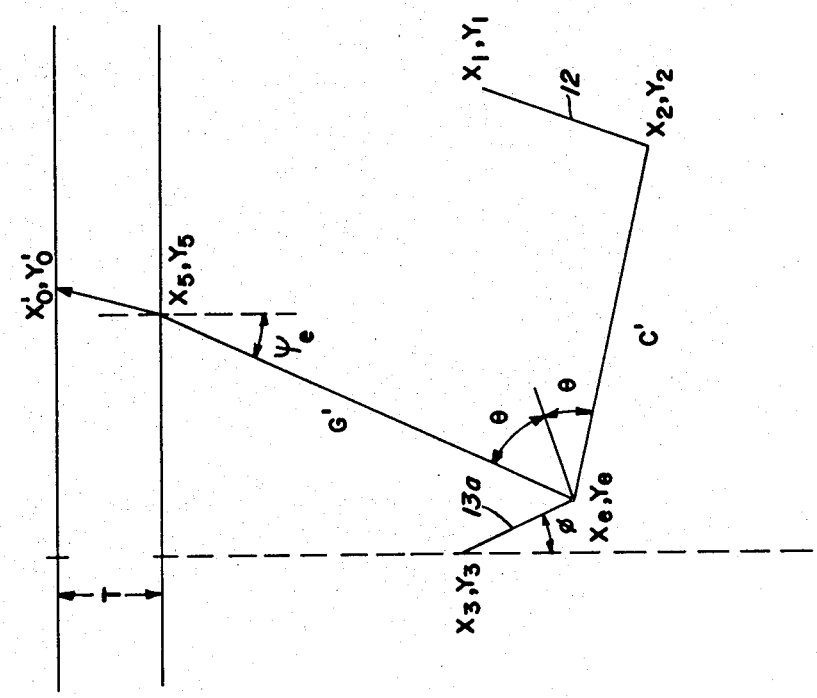
Figure 11:
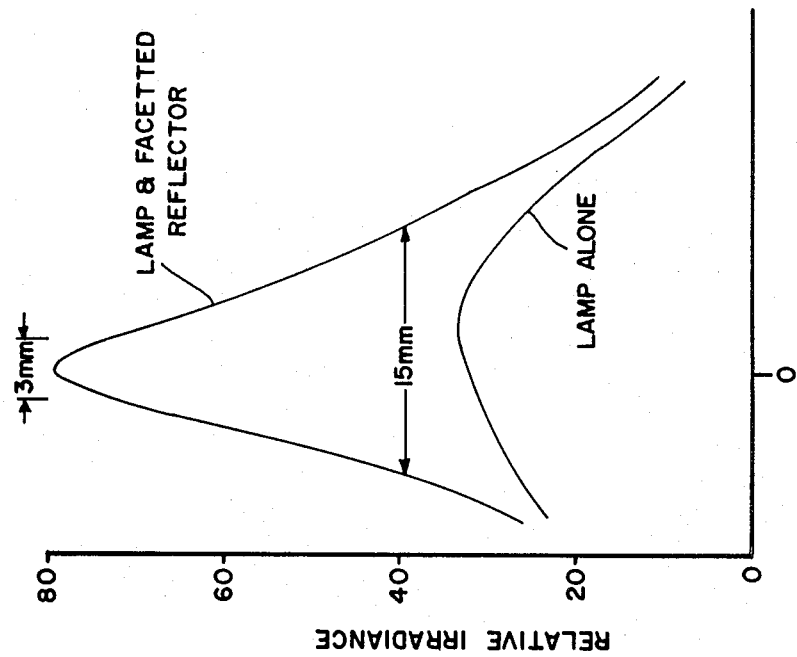
FIG. 11 is a chart showing light distribution improvement for the facet design shown in FIG. 10.

The effects of refraction, introduced by a platen of thickness T and index of refraction n are described in conjunction with FIGS. 6, 7 and 8. In FIG. 6, the Ray A' from the known starting point $X_3$, $Y_3$ of a facet strikes the platen at an unknown point $X_4$, $Y_4$, is refracted, and proceeds to the design point $X_o$, $Y_o$. The unknown angle of incidence $\psi$ may be found by iterative solution of the following transcendental equation:

$$L = \sin\psi_3 \left[\frac{T}{(n^2 - \sin^2\psi)^{\frac{1}{2}}} - \frac{D-T}{(1 - \sin^2\psi_3)^{\frac{1}{2}}}\right] \tag{25}$$

where T is the thickness of the platen.

This equation is derived by application of Snell's law to FIG. 6, where n is the index of refraction of the platen of thickness T. Once Eq. (25) is solved for $\psi_3$, the distance (L') is given by:

$$L' = (D - T)\tan \psi_3$$

which yields the coordinates of the point of incidence:

$$X_4 = X_3 + L'$$

$$Y_4 = Y_3 + (D - T)$$

Having found X, Y, facet tilt $\phi$ is determined as in the previous description (FIGS. 4-5):

$$\phi = \frac{1}{2}\cos^{-1}\left[\frac{(R')^2 - (A')^2 - B^2}{2A'B}\right] - \tan^{-1}\left(\frac{L'}{D - T}\right) - \alpha \tag{26}$$

where:

$$A' = [(X_3 - X_4)^2 + (Y_3 - Y_4)^2]^{\frac{1}{2}} \tag{27}$$

$$R' = [(X_1 - X_4)^2 + (Y_1 - Y_4)^2]^{\frac{1}{2}} \tag{28}$$

and the other variables in Eq. (26) are unchanged from above.

Determination of the end point $X_e, Y_e$ of the facet requires more than the iterative solution of a transcendental equation, however, FIG. 7 shows the rays C', G' which define $X_e, Y_e$ by specular reflection. The transcendental equation for the incidence angle $\psi$ relies on knowledge of the starting point of ray G', which is what is not initially known. Thus, a trial and error procedure is used. First, point of incidence $X_5, Y_5$ is arbitrarily chosen. This will determine the end point of the facet $X_e, Y_e$ by the requirement of specular reflection. As previously shown, specular reflection yields Eq. (8) for $Y_e$ and Eq. (17) for $X_e$ where equations (9-16) must be modified by the replacement of $X_o, Y_o$, by $X_5, Y_5$ due to the platen. However, whether or not this calculated $X_e, Y_e$ is the correct facet endpoint depends on whether the ray G' ends at the design point $X_o, Y_o$. For the chosen $X_5, Y_5$ the end point on the platen of ray G', i.e., the coordinate X' is given by the following equation:

$$X'_0 = X_5 + \frac{T(X_5 - X_e)[(Y_5 - Y_e)^2 + (X_5 - X_e)^2]^{-\frac{1}{2}}}{\left[n^2 - \frac{(X_5 - X_e)^2}{(Y_5 - Y_e)^2 + (X_5 - X_e)^2}\right]^{\frac{1}{2}}} \tag{29}$$

which is derived as follows:

FIGS. 7 and 8 show the ray G' originating at the unknown facet endpoint $X_e, Y_e$, striking the platen at $X_5, Y_5$ and proceeding to $X'_o, Y'_o$. If the point $X'_o$ of ray G' coincides with the design point $X_o$, then the facet endpoint has been correctly determined. However, if $X'_o, X_o$, then we choose another value for $X_5$, and repeat the procedure in this paragraph, iterating $X_5$ and recalculating until $X'_o$ falls within a specified increment of the design point $X_o$. The rest of the facets are designed in the same way. These calculations can be performed by a computer using programs which can be written by those skilled in the art.

A reflector constructed according to the preceding principles is shown in the FIG. 2 embodiment. The light source is a fluorescent lamp having an aperture of 60°. The center of the lamp is 1.31" (3.36 cm) from a line perpendicular to the plane of the scan strip area and 1.91" (4.9 cm) to the backbone of the reflector. The maximum possible vertical dimension that the reflector can occupy is 1.295" (3.32 cm) and the platen thickness is 0.235" (58 mm). The scan slit width is 0.064" (16 mm). Using the equations previously derived, a two facet reflector was designed for this particular system with facet 1 having a tilt angle of 13° 20' and a length E of 0.36" (80 mm) and facet 2 having a tilt angle of 29° 43' and a length of 0.35" (87.5 mm) and where facet reflectance is 85% at a wavelength of 589 $\mu m$ and the platen material index of refraction n is 1.517.

Figure 9:
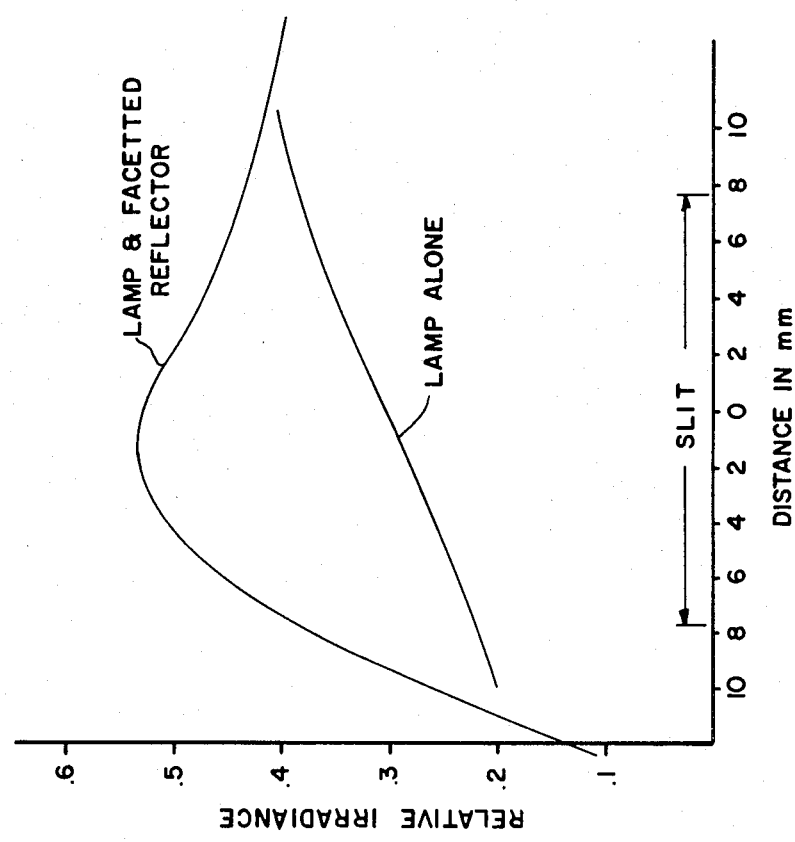
FIG. 9 is a graph illustrating the improvements in light distribution of the present invention.

Evaluation of the increased irradiance of this reflector compared to the use of a lamp only is shown in FIG. 9.

Figure 10:
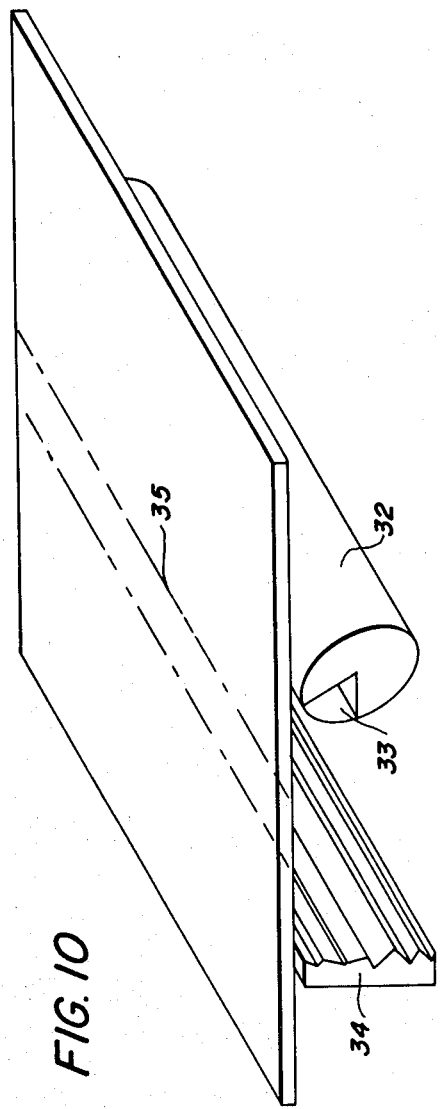
FIG. 10 illustrates a facetted reflector for a scanning illumination system having a relatively narrow exposure slit.

FIG. 10 shows an illumination system which scans an exposure slit which is narrower than the FIG. 2 embodiment. In the figure, lamp 32, which may again be a fluorescent lamp, directs light through aperture 33 towards reflector 34. In this embodiment, the lamp has a 45° aperture resulting in a narrower scanning slit 35 having a full width of 3 mm. Reflector 34 was designed with six facets, the reflector having a total length of 26 mm. Scan slit 35 is receiving more intense illumination most of which (60%) is contributed by the reflector.

In the two examples given it was apparent that the number of facets required for the more typical aperture of 60° used in conjunction with photocopying systems requires a small number of facets. As the aperture size decreases, the number of facets required increases but is still a small number compared, for example, to the hundreds which make up a Fresnel reflector. It has further been discovered that the number of facets required is inversely proportional to the size of the lamp aperture.

In summary, Applicants have described a novel facetted reflector which collects light from a source and delivers it to a document line with maximum efficiency and with no distortion due to aberrations. A general set of equations for the design of a facetted reflector were disclosed, the equations deriving the endpoints of each facet as functions of the size and orientation of the light source, the extremities and tilt of the reflector, and the platen index and thickness. Exemplary examples of reflectors were provided by way of illustration but not of limitation. Although fluorescent lamp sources have been disclosed in the embodiments shown other sources such as mercury lamps, metal halid lamps etc. may be used. The concept and scope of the invention are limited only by the following claims.

We claim:

1. An illumination system for illuminating a scan strip on an object surface, including:
   a linear light source disposed adjacent to and on one side of said scan strip said light source having an aperture defined through a portion thereof,
   a reflector located on the opposite side of said scan strip with its reflective surface facing said light source aperture,
   said light source providing two components of light to said scan strip, one component being directly transmitted through said aperture to said scan strip and the second component being reflected from said reflector to said scan strip,
   said reflector comprising a plurality of plane mirror facets, each facet having an individual surface length and disposed at an individual angle to a plane normal to said object surface such that the entire aperture of said illumination source is visible at said scan strip.

* * * * *